Figure 4:
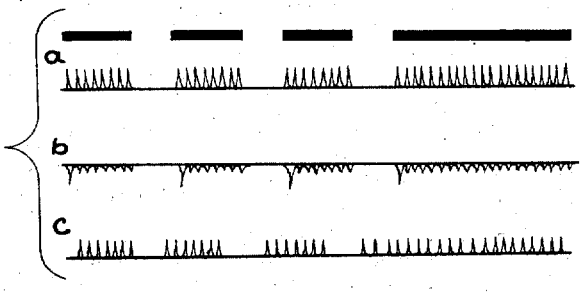

July 2, 1929. E. G. GAGE Re. 17,360
METHOD OF AND MEANS FOR SEPARATING DESIRED FROM UNDESIRED ELECTRIC CURRENTS.
Original Filed April 20, 1921 2 Sheets-Sheet 1
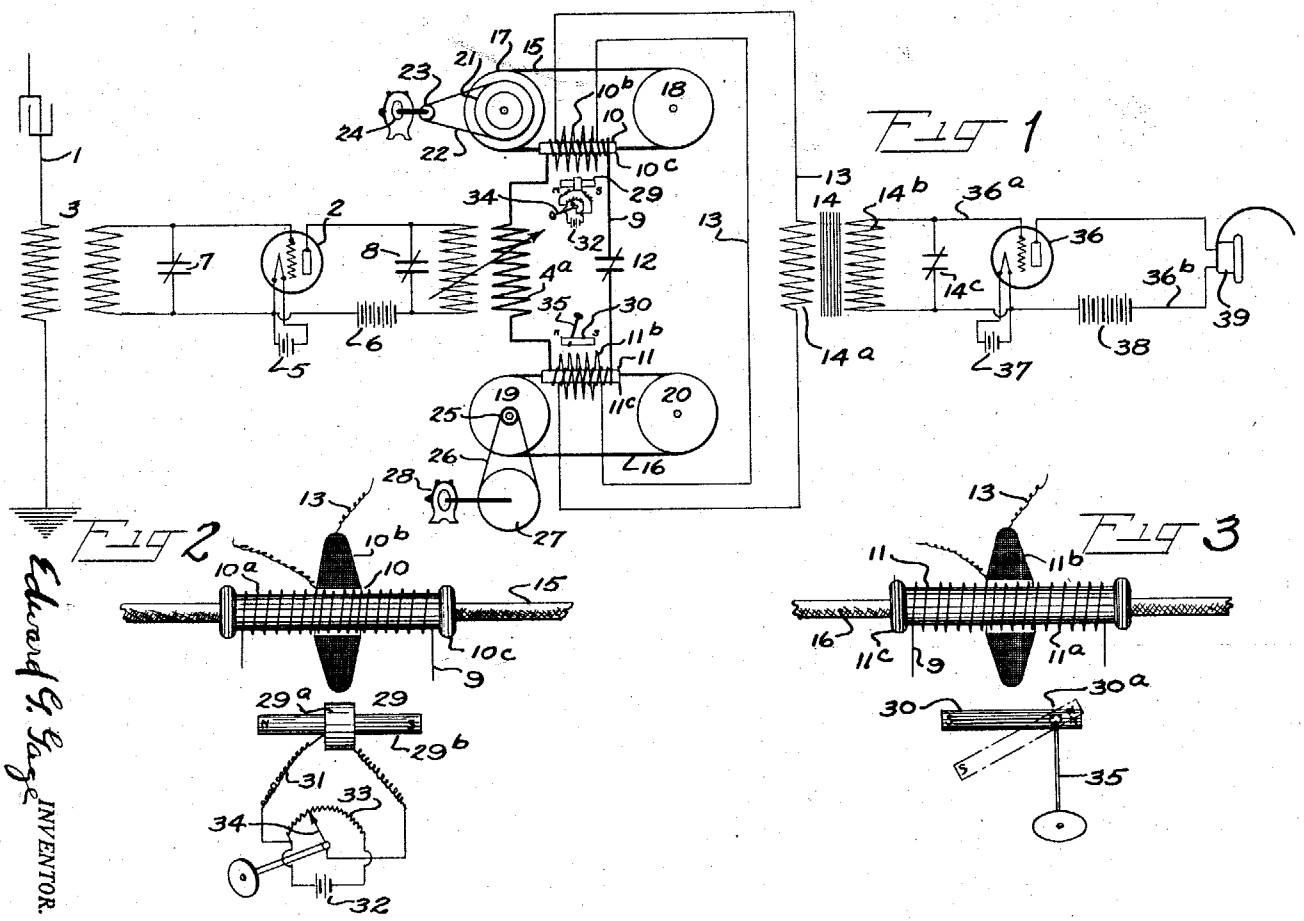
Edward G. Gage INVENTOR.
BY
Thomas Howe ATTORNEY.

Edward G. Gage INVENTOR.

BY

Thomas Howe ATTORNEY.

Reissued July 2, 1929. Re. 17,360

UNITED STATES PATENT OFFICE.

EDWARD G. GAGE, OF BROOKLYN, NEW YORK, ASSIGNOR TO RADIO CORPORATION OF AMERICA, OF NEW YORK, N. Y., A CORPORATION OF DELAWARE.

METHOD OF AND MEANS FOR SEPARATING DESIRED FROM UNDESIRED ELECTRIC CURRENTS.

Original No. 1,550,023, dated August 18, 1925, Serial No. 463,072, filed April 20, 1921. Renewed September 12, 1924. Application for reissue filed August 15, 1927. Serial No. 213,103.

In the art of radio telegraphy and telephony currents in the atmosphere frequently interfere with the reception of signals desired in the receivers or indicators of receiving sets. Under some conditions natural disturbances in the atmosphere, known as "atmospherics" or "static", "strays" etc., interfere with the reception in receiving instruments of the desired signals transmitted from sending instruments. Also in the art of line wire communication, such as telegraph and telephone lines, disturbing influences are sometimes present in the circuit of a lower frequency than the currents desired for the proper operation of receiving instruments.

An object of my invention is to separate desired from undesired currents at a receiving instrument, or, in other words, to eliminate from the receiver the disturbances produced by the undesired currents and to permit the desired currents only to usefully affect the receiving instrument or telephone receiver.

In carrying out my invention I provide means interposed in the circuit between the receiver and the collector or antenna to cancel low frequency currents that may arrive in the collector or line of a radio circuit, or the line circuit of a telegraph or telephone system, and to utilize in the receiver only currents other than low frequency, or, in other words, where it is desired to receive currents other than irregular or low frequency the latter are eliminated or annulled before they can affect the receiver. When low group frequency is referred to herein the term is intended to include irregular impulses.

In carrying out my invention in forms illustrated in the accompanying drawings, I provide two instruments used in conjunction in a circuit between a receiver and a collector or line, in one of which instruments currents of both high and irregular or low frequency are reproduced and in the other of which instruments currents of low frequency only are reproduced, the said low frequency currents opposing one another whereby the low frequency currents are cancelled by their opposition, and as there is little or no opposition in said instruments to the high frequency currents, the latter only are effective in the receiver as the desired currents. The instruments referred to include transformers having their primary windings in circuit to receive impulses from the collector or line through suitable instrumentalities, the secondaries of said transformers also being in circuit and including means to transmit currents for the receiver, preferably by means of amplifier devices, said transformers being provided with movable iron cores operated at different speeds. The speed of renewal of one transformer core being faster than the other will reproduce currents of both high and low frequency, while the speed of the core of the latter transformer being less will reproduce low frequency currents only, with the result that the low frequency currents in said transformers will cancel, permitting only the high frequency currents usefully to affect the receiver.

Figure 5:
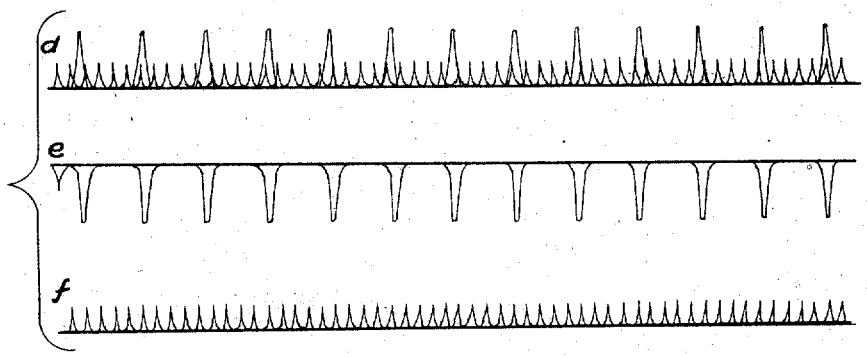
Figure 6:
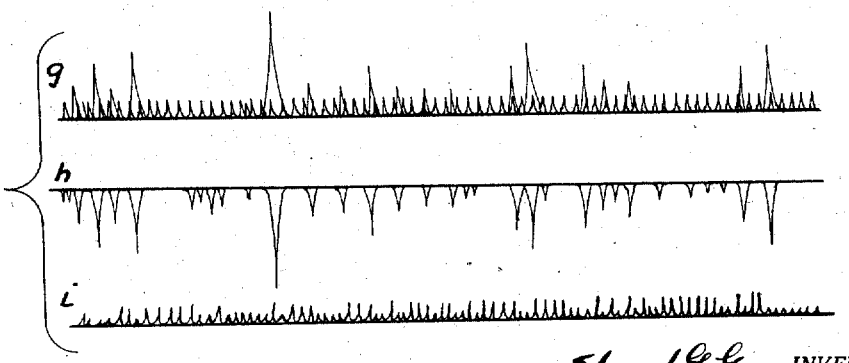

Reference is to be had to the accompanying drawings forming part hereof, wherein Figure 1 is a diagrammatic view of a radio receiving system embodying my invention; Figs. 2 and 3 are enlarged sectional detail views of the aforesaid transformers; Figs. 4, 5, and 6 are diagrams illustrating graphically the method of separating desired from undesired currents.

A receiving circuit is indicated at 1, which may be an antenna or collector of any suitable character well known in the radio art, or the line of a telegraph or telephone circuit, shown used in connection with a vacuum tube amplifier indicated generally at 2 for amplifying received signals, the circuits of which include a transformer 3 in the input circuit and a transformer 4 in the output circuit, said circuits including electrical sources 5, 6, and tuning condensers 7, 8, in an ordinary manner. While I have illustrated the foregoing circuits as capable of use in connection with my improvements it will be understood that the latter are not limited to use with such circuits. Included in the input circuit 9 of the secondary 4a of transformer 4 are the primary windings $10^a$, $11^a$, of two transformers 10 and 11, which primaries are shown in series. Included in circuit 9 a condenser 12 is shown which may be a variable air condenser. The secondary windings $10^b$, $11^b$, of transformers 10 and 11, are included in opposition in output circuit 13, one part of which circuit includes the primary winding $14^a$ of a repeating coil 14. The windings of the transformers 10 and 11 are shown on non-magnetic tubes $10^c$, $11^c$, respectively, and at 15, 16, are cores, preferably of iron, to be magnetized within the windings of said transformers. Across the secondary of said repeating coil is the small condenser $14^c$ which acts as a short circuit for any currents of radio frequency that might otherwise affect the vacuum tube 36.

The cores 15, 16 may be in the form of endless iron wires, the core 15 being mounted upon pulleys 17, 18, and the cores 16 being mounted upon pulleys 19, 20, which pulleys may be pivotally supported in any suitable manner, whereby the cores may travel through the corresponding tubes $10^c$, $11^c$. Said pulleys may be rotated in any suitable manner. I have shown a pulley 21 that is connected to pulley 17 and receives a belt 22 from a drive pulley 23 to be operated by any suitable means, such as by an electric motor 24. A pulley 25 attached to pulley 19 receives belt 26 from a pulley 27 that may be operated in any suitbale manner, as by an electric motor 28. Said pulleys may be operated manually. Assuming that motors 24 and 28 operate at similar constant speeds, and that pulley 21 is of greater diameter than pulley 25, it will be apparent that pulleys 17, 18 and core 15 will operate slower than pulleys 19, 20 and core 16. A magnet 29 is located adjacent to transformer 10 to maintain a constant magnetizing force on core 15 within transformer 10, and a magnet 30 is located adjacent to transformer 11 to maintain a constant magnetizing force upon core 16 within said transformer. Magnets 29, 30 are permanent magnets, and their magnetizing force respecting cores 15, 16, may be varied in any desired manner. Magnet 29 is shown in the form of an electromagnet having a winding $29^a$ on core $29^b$, said winding being in a circuit 31 including battery 32, a resistance 33 and a movable contact 34 operative with said resistance, which contact 34 may be moved as required to vary the magnetization of core $29^b$. Magnet 30 is shown as a permanent magnet movably supported at $30^a$ and having a member 35 for manually operating the magnet to vary its proximity to core 16. The magnetizing force of the magnets 29, 30, may be varied at will by adjusting contact 34 or magnet 30, as may be required. As an example of the speed ratios of the two transformer cores, which resemble magnetic detectors, I have found that for eliminating irregular or low group frequencies below 200 per second, and receiving a signal of say, from 200 to 2,000 per second, a speed of one foot in five minutes is suitable for the slowly renewed core 15, and one foot in two seconds is suitable for the rapidly renewed core 16. It is important that the constants of both transformers be made nearly the same in order to obtain effective cancellation of impulses which affect both alike. A convenient size for the cores of the transformer in eliminating atmospherics or strays is ⅛ inch in diameter and 36 inches in length run over pulleys 4 inches in diameter. I have found it to be important to adjust the magnet 30 at the correct angle with relation to the secondary $11^b$, for a given frequency, otherwise the noise of molecular movements of the iron may obliterate very faint signals.

The circuits of vacuum tube audio frequency amplifier 36 include electrical sources 37, 38. The input circuit $36^a$ of amplifier 36 includes winding $14^b$ of amplifier coil 14, and the output $36^b$ of said amplifier includes a receiver 39, such as a telephone receiver or current indicator.

The cores 15, 16 are continuously operated at substantially constant but different speeds when signals are to be received. A train of impulses arriving at the antenna or line 1 are transferred by means of the radio frequency amplifier 2 to the primary windings $10^a$, $11^a$, of transformers 10, 11, hence affect the secondary windings $10^b$, $11^b$, of said transformers. Assuming that the impulses received in primary windings $10^a$, $11^a$ include currents of low group frequency and currents of high group frequency, the low group frequency currents being in opposition in the windings $10^a$, $11^a$ will cancel one another or be eliminated and the currents of high group frequency only will affect the repeating coil 14 and be transmitted through amplifier 36 and the circuits $36^a$ and $36^b$ to receiver or indicator 39.

The cancellation of the low group frequency current and its separation from the high group frequency is caused by the action of the iron in the cores of the transformers 10 and 11, and by reason of the cores 15 and 16 operating at different speeds.

The magnetizing forces exert strains on the molecules of the moving cores, and the rapidity with which the molecules of the fast moving core are restored to normal and renewed when affected by high frequency currents, differs from the rapidity with which the molecules of the slowly moving core are restored to normal and renewed, with a consequent difference in the reproduction of the high frequency currents by transformers 10 and 11. I have ascertained in the practice of my invention that a transformer, organized in the manner described, with its core being renewed slowly, responds, at a certain speed, with a certain magnetization, more energetically to a low than to a high group frequency, and that such a transformer with rapidly renewed core not only responds to very high group frequency that fails to actuate such a transformer with slow moving core but fails to respond as energetically to a slow as to a high group frequency, although the last named transformer also responds to low group frequencies. Since both transformers respond to low group frequencies and since the transformer having the slower moving core does not respond to the high group frequencies (but the transformer having the faster moving core does respond to high group frequencies), it will be understood that, as before stated, the low group frequencies being in opposition in the circuits of the secondaries of the two transformers, oppose one another and are cancelled, thereby permitting only the high group frequencies to pass from the transformer having the faster renewable core to the receiver or indicator 39. High group frequencies do not appear in the secondary $10^b$ of the slowly operating transformer 10 because that portion of the iron in the transformer core 15 is rendered inoperative to high group frequencies by exhaustion. One transformer does not respond to high group frequency because of the suppressing or fatiguing effect of the high group frequency on the core, still it is able to respond to low group frequency in the absence of such suppressing or exhausting effect. In other words, the high frequency does not permanently disable the slowly moving transformer. I assume that the outside only of the cores is affected by the high group frequency, leaving the inside portion to respond to the low group frequency. By the means described I am enable to select for the receiver or indicator the desired currents and to eliminate the undesired currents received together at the antenna or collector. In case no high frequency currents are received by the apparatus, nothing will be shown in the receiver or indicator because the low frequency currents received by the apparatus will be cancelled. If there is high frequency current that will be indicated by the receiver or indicator regardless of what low frequency currents may at the same time be received in the antenna or line circuit.

While I have referred to low frequency currents it will be understood that similar effects occur with regard to currents of irregular grouping or amplitude, since they will be cancelled in like manner explained regarding low frequency currents. The reference to high frequency currents I have made, means desired currents as distinguished from undesired, such as low or irregular group frequency currents.

Although I have illustrated and described the secondary windings $10^b$ and $11^b$ of transformers 10 and 11 as being wound in opposite directions or in opposition in circuit 9, with the magnets 29 and 30 arranged to magnetize the moving cores, it will be understood that the windings $10^b$, $11^b$, may be in the same direction and that the polarity of magnets 29 and 30 may be reversed with respect to each other.

In Figs. 4, 5, and 6 I have illustrated graphically the effect of the apparatus described in receiving currents of high and low frequency.

Fig. 4 represents graphically, without interference, the letter "V" as received on an antenna from a radio transmitter and transferred by means of amplifier 2 to transformers 10 and 11. Said figure indicates the action of such a series of impulses on each instrument along and the result in a telephone, such as receiver 39, of the combination of these impulses. In Fig. 4, *a* indicates currents of high group frequency in transformer 11, and corresponds exactly with the transmitted group frequency. *b* in Fig. 4 indicates the same signal as received by transformer 10, and illustrates only the first impulse of the train, in reverse direction from that in transformer 11. There is, also, a current of very small amplitude following the first impulse, due to exhaustion of the action of transformer 10. *c* in Fig. 4 indicates the resultant or algebraic sum of these two opposed currents in transformers 10 and 11, and indicates a train of impulses similar to the original series sent out by the transmitter, but minus the first impulse in the train, and of slightly decreased amplitude, caused by the partial cancellation of the signal due to partial operation of transformer 10 with respect to the high group frequency.

In Fig. 5 are represented two wave trains one of high group frequency, and one of low, the low group frequency having the greater amplitude. At *d* in Fig. 5 is represented both high and low group frequencies (signals) present in the secondary circuit of transformer 11, and *e* represents the currents in transformer 10. It will be noted that only the low group frequency *e* is present in transformer 10 while both high and low group frequencies are present in transformer 11. It will also be noted that the direction of current flow of the low group frequency *e* in the transformer 10 is opposite to and in synchronism with that in transformer 11 as shown by their relative positions on a zero line. At *f* in Fig. 5 is represented the resultant or desired current after the low group frequencies in transformers 10 and 11 have opposed and cancelled, the resultant *f* indicating that the low group frequency has been cancelled out, the high group frequency only remaining.

Fig. 6 illustrates a train of signal impulses arriving at the antenna or collector and transferred therefrom by means of the radio frequency amplifier 2 and the circuits associated therewith to the primary circuit windings $10^a$, $11^a$, of the transformers 10, 11, hence, to the secondary circuits thereof which are in series. At *g* in Fig. 6 is represented both desired and undesired currents as they are present in the circuits referred to while at *h* in Fig. 6 is represented currents in the secondary of transformer 10, the resultant current present in the secondaries of transformers 10 and 11 being represented at *i* in Fig. 6, after the currents have been opposed in said secondaries by reason of the direction of the windings or reversal of polarity of the magnets 29 and 30. In said figure the desired currents are represented by a regular train of waves of high group frequency as sent out by a radio transmitter, the undesired currents being represented by a train of irregular waves as indicated at *h*, such as produced by atmospheric strays, both of such currents being represented at *g*.

Having now described my invention, what I claim is:—

1. The method of separating desired audio frequency currents from undesired audio frequency currents in a circuit including transformers and a radio frequency amplifier consisting in passing desired and undesired currents through the input and output circuits of a radio frequency amplifier, passing said currents through a plurality of transformers having cores, and causing separation of the desired from the undesired currents in the cores of said transformers.

2. The method of separating desired audio frequency currents from undesired audio frequency currents in a circuit including transformers having cores consisting in causing said undesired currents to energize the input circuits of said transformers in opposition, and causing the desired currents to de-energize one of said transformers.

3. The method of separating desired audio frequency currents from undesired audio frequency currents in a circuit including transformers having cores consisting in causing said undesired currents to energize the input circuits of said transformers in opposition, and causing the desired currents to de-energize one of said transformers by a signal frequency higher than the frequency of the undesired currents.

4. The method of separating desired audio frequency currents from undesired audio frequency currents in a circuit including transformers having cores consisting in causing said currents simultaneously to flow through the primaries of a plurality of transformers and causing separation of the desired from the undesired currents in the cores of said transformers.

5. The method of separating desired audio frequency currents from undesired audio frequency currents in a circuit including transformers having cores consisting in causing said currents simultaneously to flow through the primaries of a plurality of transformers, causing separation of the desired from the undesired currents in the cores of said transformers, and causing the desired current to affect the circuit of a receiver.

6. Means for separating desired from undesired electric currents comprising a plurality of instruments having a common circuit to simultaneously receive said currents, said instruments having moving parts to cause cancellation in said instruments of said undesired currents by exhaustion of one of the instruments, and a circuit from said instruments to receive the uncancelled currents.

7. Means for separating desired from undesired electric currents comprising a plurality of instruments having a common circuit to simultaneously receive said currents, said instruments having moving parts to cause cancellation in said instruments of said undesired currents by exhaustion of one of the instruments, and a circuit from said instruments to receive the uncancelled currents, an amplifying coil in said circuit, and a receiver in circuit with a winding of said coil.

8. Means for separating desired from undesired electric currents comprising a plurality of instruments having a circuit to simultaneously receive said currents, movable parts for said instruments, means to impart to said parts different magnetic excitations, and a circuit from said instruments to receive desired currents therefrom.

9. Means for separating desired from undesired electric currents comprising a plurality of instruments having a circuit to simultaneously receive said currents, movable parts for said instruments, means to impart to said parts different magnetic excitations, a circuit from said instruments to receive desired currents therefrom, an amplifying coil in said circuit, and a receiver in circuit with a winding of said coil.

10. Means for separating desired from undesired electric currents comprising a plurality of intruments having a circuit to simultaneously receive said currents, means to differentially energize said instruments magnetically, means to cause cancellation in said instruments of said undesired currents, and a circuit from said instruments to receive the uncancelled currents.

11. Means for separating desired from undesired electric currents comprising a plurality of instruments having a common input circuit to simultaneously receive said currents, said instruments having moving parts and means to differentially magnetize said instruments to render one of said instruments capable of becoming inoperative by exhaustion, and means to receive desired currents from said instruments.

12. Means for separating desired from undesired electric currents comprising a plurality of instruments having a common input circuit to simultaneously receive said currents, one of said instruments being subject to exhaustion from currents of high frequency, to render said instrument inoperative, the other instrument not being subject to exhaustion, an output circuit for said instruments, and means for indicating in the output circuit the difference in current strength in said instruments.

13. The combination of two instruments having windings in an input circuit and other windings in an output circuit, means to cause desired and undesired currents to be received in the input circuit, movable cores for said instruments, means to operate said cores at different speeds, and means to receive desired currents from said output circuit.

14. The combination of two instruments having windings in an input circuit and other windings in an output circuit, means to cause desired and undesired currents to be received in the input circuit, movable cores for said instruments, means to operate said cores at different speeds, means to rereceive desired currents from said output circuit, and means to variably affect said instruments.

15. The combination of a plurality of transformers having their primary windings in an input circuit and their secondaries in an output circuit, movable cores for said transformers, means to operate said cores at different speeds, and means to receive desired currents from said output circuit.

16. The combination of two instruments having windings in an input circuit and other windings in an output circuit, means to cause desired and undesired currents to be received in the input circuit, movable cores for said instruments, means to operate said cores at different speeds, means to receive desired currents from said output circuit, means to variably affect said instruments, and means to variably energize said transformers.

17. The combination of a receiving circuit, a plurality of transformers having their primaries in an input circuit and their secondaries in an output circuit, means to transmit desired and undesired currents from the receiving circuit to said input circuit, movable parts for said trnasformers, means to operate said parts at different speeds, a receiver, and means to affect said receiver by currents from said output circuit.

18. The combination of a receiving circuit, a plurality of transformers having their primaries in an input circuit and their secondaries in an output circuit, means to transmit desired and undesired currents from the receiving circuit to said input circuit, movable parts for said transformers, means to operate said parts at different speeds, a receiver, means to affect said receiver by currents from said output circuit, and means to variably energize said transformers.

19. The combination of a receiving circuit, a plurality of transformers having their primaries in an input circuit and their secondaries in an output circuit, means to transmit desired and undesired currents from the receiving circuit to said input circuit, movable parts for said transformers, means to operate said parts at different speeds, an amplifier having a coil included in said output circuit, a receiver, and a circuit for the receiver including the secondary winding of said amplifier.

20. The combination of a receiving circuit, a plurality of transformers having their primaries in an input circuit and their secondaries in an output circuit, said input circuit including the secondary of a transformer, the primary of said transformer being in a circuit associated with said receiving circuit and including an amplifier, said first named transformers having movable cores, means to operate said cores at different speeds, a receiver, and means to transmit desired currents from said output circuit to said receiver.

21. The combination of a receiving circuit, a plurality of transformers having their primaries in an input circuit and their secondaries in an output circuit, said input circuit including the secondary of a transformer the primary of said transformer being in a circuit associated with said receiving circuit and including an amplifier, said first named transformers having movable cores, means to operate said cores at different speeds, a receiver, and a circuit including the receiver and amplifying means, said circuit being associated with said output circuit.

22. The combination of a receiving circuit, a plurality of transformers having their primaries in an input circuit and their secondaries in an output circuit, said input circuit including the secondary of a transformer, the primary of said transformer being in a circuit associated with said receiving circuit and including an amplifier, said first named transformers having movable cores, means to operate said cores at different speeds, a receiver, a circuit including the receiver and amplifying means, and a repeater coil having a secondary winding in the last named circuit and a primary winding in said output circuit.

23. Means for separating desired from undesired electric currents comprising a plurality of instruments having a common input circuit to simultaneously receive said currents, one of said instruments being adapted to receive a complete train of electric impulses and the other instruments being adapted to receive a relatively incomplete train of impulses, said instruments being connected in opposition, an output circuit associated with said instruments, and means in the output circuit to utilize desired currents from said instruments.

24. Means for separating desired from undesired electric currents comprising a plurality of instruments having a common input circuit to simultaneously receive said currents, one of said instruments being subject to a weakening with time to render said instrument relatively inoperative, the operating action of the other instrument being less subject to a weakening with time than that of the first named instrument, an output circuit for said instruments and means in the output circuit for utilizing the desired currents.

25. The method of separating desired from undesired electric currents consisting in amplifying said currents, causing a portion of one of said currents to be suppressed by a weakening with time of the action producing it, placing said currents in opposition to cancel the initial impulses of the currents, and utilizing the remaining currents.

26. The method of separating desired from undesired electric currents consisting in receiving and amplifying interrupted currents, causing all except the initial impulses of one of said amplified interrupted currents to be suppressed by a weakening with time of the action, placing said interrupted currents in opposition to cancel the initial impulse of the currents, causing said suppressed impulses to be restored between interruptions, and utilizing the remaining current.

27. The method of separating desired from undesired electric currents consisting in receiving and amplifying said currents in the form of a complete train of electrical impulses, receiving and amplifying said currents in the form of a relatively incomplete train of electrical impulses, opposing said complete and incomplete trains of impulses to cancel undesired currents, and utilizing the remaining currents.

28. The method of separating desired from undesired electric currents consisting in receiving and amplifying said currents in the form of a complete train of electrical impulses, receiving and amplifying said currents in the form of a relatively incomplete train of electric impulses by causing certain impulses in the train to be suppressed by a weakening with time of the operating action, causing said suppressed impulses to be restored after suppression, opposing said complete and incomplete trains of impulses to cancel undesired currents, and utilizing the remaining currents as desired currents.

29. The method of indicating desired electric currents in the presence of undesired electric currents which consists in receiving, amplifying and registering both desired and undesired currents in such a manner that the undesired currents are prevented from being indicated except upon the reception of desired currents whereby both desired and undesired currents will be recorded.

30. The method of indicating desired electric currents in the presence of undesired electric currents, which consists in receiving and in amplifying said currents, in causing the transference of said desired currents from the amplifying system according to the time of the operative action thereof, in preventing a transformer of said undesired currents from the amplifying system due to the insufficient time duration of said undesired currents, and in indicating the resulting currents.

31. The method of separating radio currents received from two or more different sources, comprising impressing signals received from one source on a translating device, and periodically altering at least one of the constants of said translating device under control of signals received from the other source.

32. The method of separating desired from undesired electric currents which consists in selecting and in registering the respective currents in accordance with the relative persistency of their group frequencies.

33. A method of separating desired from undesired electric currents by means of a plurality of opposed indicating instruments, which consists in receiving and in amplifying said currents, passing said currents through the plurality of opposed instruments, and disabling certain of the opposed instruments by the desired current for indicating the said desired current.

EDWARD G. GAGE.